United States Patent [19]
Ishizuki et al.

[11] Patent Number: 5,015,807
[45] Date of Patent: May 14, 1991

[54] SHIFT LEVER APPARATUS FOR AUTOMOTIVE VEHICLES

[75] Inventors: Masaharu Ishizuki, Zama; Hiroshi Sakon, Kosai, both of Japan

[73] Assignee: Nissan Motor Co., Ltd., Yokohama, Japan

[21] Appl. No.: 512,758

[22] Filed: Apr. 20, 1990

[30] Foreign Application Priority Data

Apr. 25, 1989 [JP] Japan .................................. 1-103514

[51] Int. Cl.$^5$ ............................................. H01H 9/06
[52] U.S. Cl. ................................................. 200/61.88
[58] Field of Search ............... 200/61.87, 61.88, 61.89, 200/61.9, 61.91

[56] References Cited

U.S. PATENT DOCUMENTS

| | | | |
|---|---|---|---|
| 4,482,885 | 11/1984 | Mochida | 200/61.91 X |
| 4,513,276 | 4/1985 | Kubota et al. | 200/61.88 X |
| 4,850,238 | 7/1989 | Inoue | 200/61.88 X |

*Primary Examiner*—J. R. Scott
*Attorney, Agent, or Firm*—Thomas, Kerr & Kayden

[57] ABSTRACT

An intermediate lever is additionally disposed between the position pin of the shift lever shifted to Park-position and the Park-position detecting switch. Therefore, even if the axial stroke of the position pin along the shift lever at Park-position changes according to the models of the shift lever apparatus, it is possible to use in common the same standardized Park-position detecting switch by changing the shape or dimensions of only the intermediate lever, thus reducing the parts stock or maintenance cost thereof. Further, it is also possible to mount the switch at any desired position away from the pin locating cutout formed in the shift lever support frame.

4 Claims, 5 Drawing Sheets

SHIFT LEVER APPARATUS FOR AUTOMOTIVE VEHICLES

BACKGROUND OF THE INVENTION

1. Field of the Invention

The present invention relates lo a shift lever apparatus for automotive vehicles, and more specifically to a shift lever apparatus provided with a Park-position detecting switch to light up a parking lamp, for instance.

2. Description of the Prior Art

FIG. 1 shows a conventional shift lever apparatus for an automotive vehicle provided with a Park-position detecting switch.

In the drawing, the apparatus comprises a shift lever support plate 56 fixed upright to an apparatus frame 52, a shift lever 51 pivotally supported via a pivotal shaft 53 by the support plate 56, a position pin 55 disposed movably along the axial direction of the shift ever 51, and a Park-position detecting switch 58 provided with a switch actuator 58a. In more detail, the support plate 56 is formed with a pin locating cutout 56a having shift positions of Park (P), Reverse (R), Neutral (N), Drive (D), Second (II) and First (I). The position pin 55 is engaged with the cutout 56a and urged upward by a spring (not shown) disposed within the shift lever 51 into contact with each of the above mentioned shift positions in the pin locating cutout 56a. The Park-position detecting switch 58 having a switch actuator 58a is fixed to the support plate 56 on the Park-position side thereof.

In operation, when the shift lever 51 is shifted to the Park (P) position, since the position pin 55 is urged upward by the spring (not shown) disposed within the shift lever 51 and therefore the switch actuator 58a is moved in the upward direction, the Park-position detecting switch 58 is turned on to light up a parking lamp, for instance so that the driver can confirm that the shift lever 51 has been securely shifted to the Park-position.

In general, in FIG. 1, the stroke S of the position pin 55 at the Park-position between when the pin 55 is in contact with the lower cutout side surface (the switch 58 is turned off) and when the pin 55 is in contact with the upper cutout side surface (the switch 58 is turned on) is different according to the shift lever apparatus or according to vehicle models. In the conventional shift lever apparatus, therefore, there exists a problem in that high-precious Park-position detecting switches 58 of various kinds having different actuation strokes must be prepared according to various vehicle models so that each actuation stroke of the Park-position detecting switch 58 matches each stroke of the position pin 55 at the Park-position within the pin locating cutout 56a of the support plate 56. In other words, it has been impossible to use the Park-position detecting switch in common for automatic transmissions of various models, thus preventing the standardization of the Park-position detecting switch and therefore increasing the stock or maintenance cost thereof.

In addition, since various parts such as illumination devices are usually mounted on the shift lever support plate 56 of the shift lever apparatus, it has been rather difficult to mount the Park-position detecting switch just near the pin locating cutout 56a or on the Park-position cutout side.

SUMMARY OF THE INVENTION

With these problems in mind, therefore, it is the primary object of the present invention to provide a shift lever apparatus for an automotive vehicle, by which the Park-position detecting switch can be used in common for various models of automotive vehicles to reduce the stock cost and disposed at any desired positions away from the pin locating cutout formed in the shift lever support frame.

To achieve the above-mentioned object, the shift lever apparatus for an automotive vehicle, according to the present invention, comprises: (a) a shift lever support frame (16A) formed with a pin locating cutout (16a) including at least a Park-position; (b) a shift lever (5) pivotally supported by said shift lever support frame; (c) a position pin (2) attached to said shift lever so as to be movable along an axial direction of said shift lever and engageable with the pin locating cutout; (d) a Park-position detecting switch for detecting that said position pin is shifted to the Park-position in the pin locating cutout; and (e) switch actuating power transmitting means (8) disposed between said position pin and said Park-position detecting switch, for actuating said Park-position detecting switch only when said shift ever is shifted to the Park-position. In the first embodiment of the present invention, the switch actuating power transmitting means is an intermediate lever (8) having a first end engageable with said position pin shifted to the Park-position, a second end engageable with an actuator of said Park-position detecting switch, and a pivotal center located between said first and second ends, a ratio of a first length ($L_1$) between the pivotal center of said intermediate lever and the first end to a second length ($L_2$) between the pivotal center of said intermediate lever and the second end being adjusted according to an axial stroke of said position pin of said shift lever at the Park-position to obtain a constant switch actuation stroke of said Park-position detecting switch. Further, in the second embodiment of the present invention, the switch actuating power transmitting means comprises: (a) a pivotal cantilever (8A) having a first pivotal center and a first free end engageable with said position pin shifted to the Park-position; and (b) a link lever (8B) pivotally supported at a second pivotal center of said pivotal cantilever and having a second free end engageable with an actuator of sad Park-position detecting switch, a ratio of a first length ($L_{1A}$) between the first pivotal center and the first free end to a second length ($L_{2A}$) between the first pivotal center and the second pivotal center being adjusted according to an axial stroke of said position pin of said shift lever at the Park-position to obtain a constant switch actuator stroke of said Park-position detecting switch. Further, in usual, an elastic member is further disposed to urge the switch actuating power transmitting means to such a position that the position pin is engageable with the switch actuating power transmitting means when shifted to the Park-position.

In the shift lever apparatus according to the present invention, since the axial stroke of the position pin at the Park-position is transmitted to the Park-position detecting switch via the switch actuating power transmitting means, even when the position pin stroke at the Park-position changes according to the models of the automotive vehicles, it is possible to use in common the same standardized Park-position detecting switch by simply changing the dimensions of only the power transmitting means, so that the parts stock cost can be reduced. Further, the Park-position detecting switch can be mounted at any desired position away from the pin locating cutout formed in the shift lever support frame, thus reducing the size of the shift lever apparatus.

BRIEF DESCRIPTION OF THE DRAWINGS

FIG. 4(B) is an enlarged partial front view similar to FIG. 4(A), in which the Park-position detecting switch is turned on.

DETAILED DESCRIPTION OF THE PREFERRED EMBODIMENTS

With reference to the attached drawings, embodiments of the shift lever apparatus according to the present invention will be described in detail hereinbelow.

Figure 1:
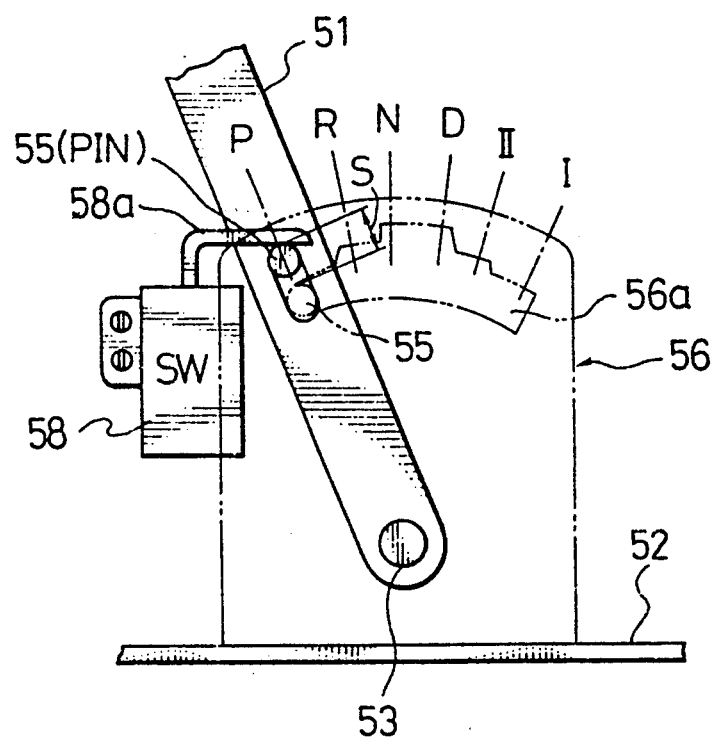
FIG. 1 is a partial front view showing a typical conventional shift lever apparatus.
Figure 2:
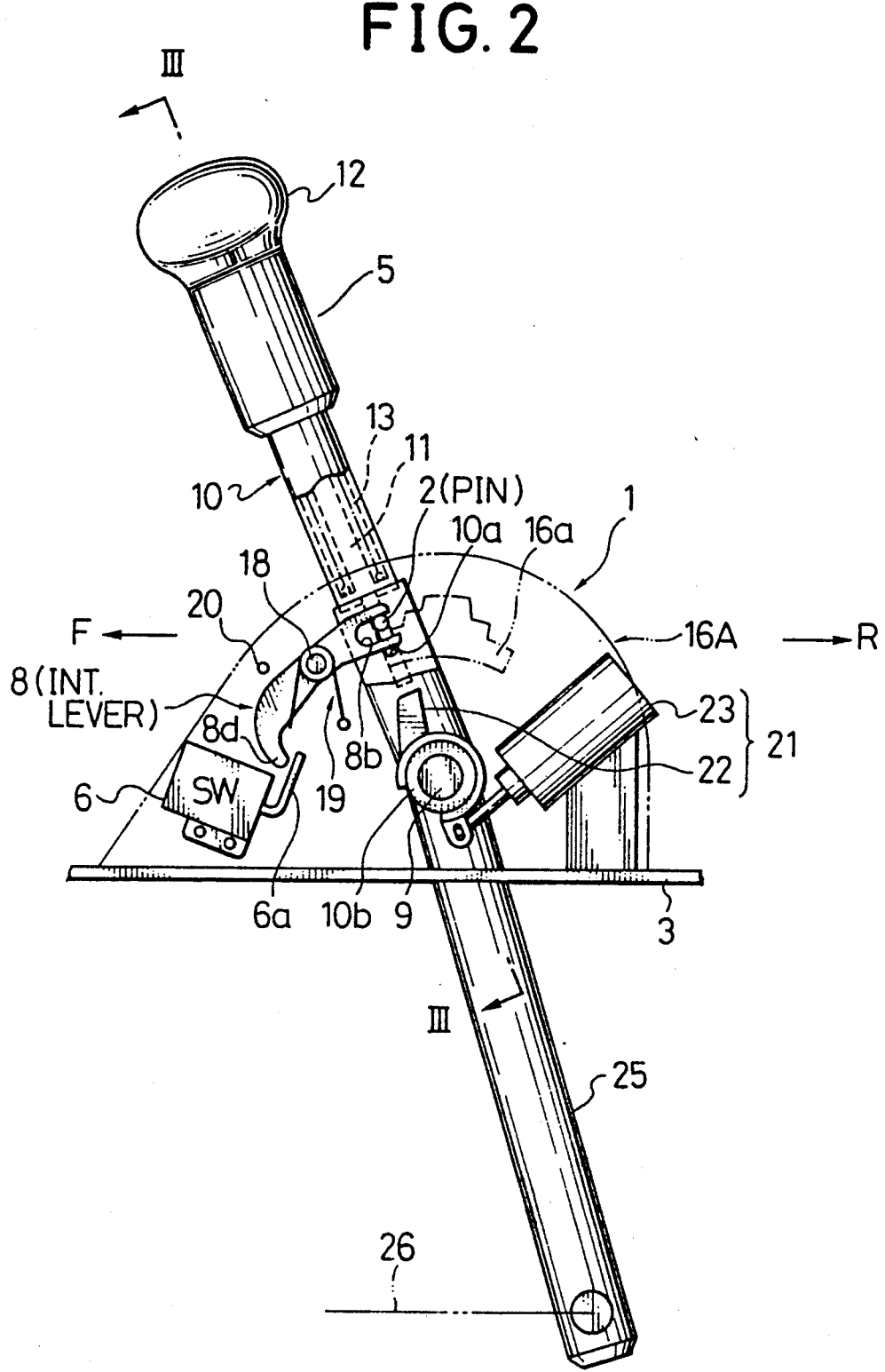
FIG. 2 is a front view showing a first embodiment of the shift lever apparatus according to the present invention.
Figure 3:
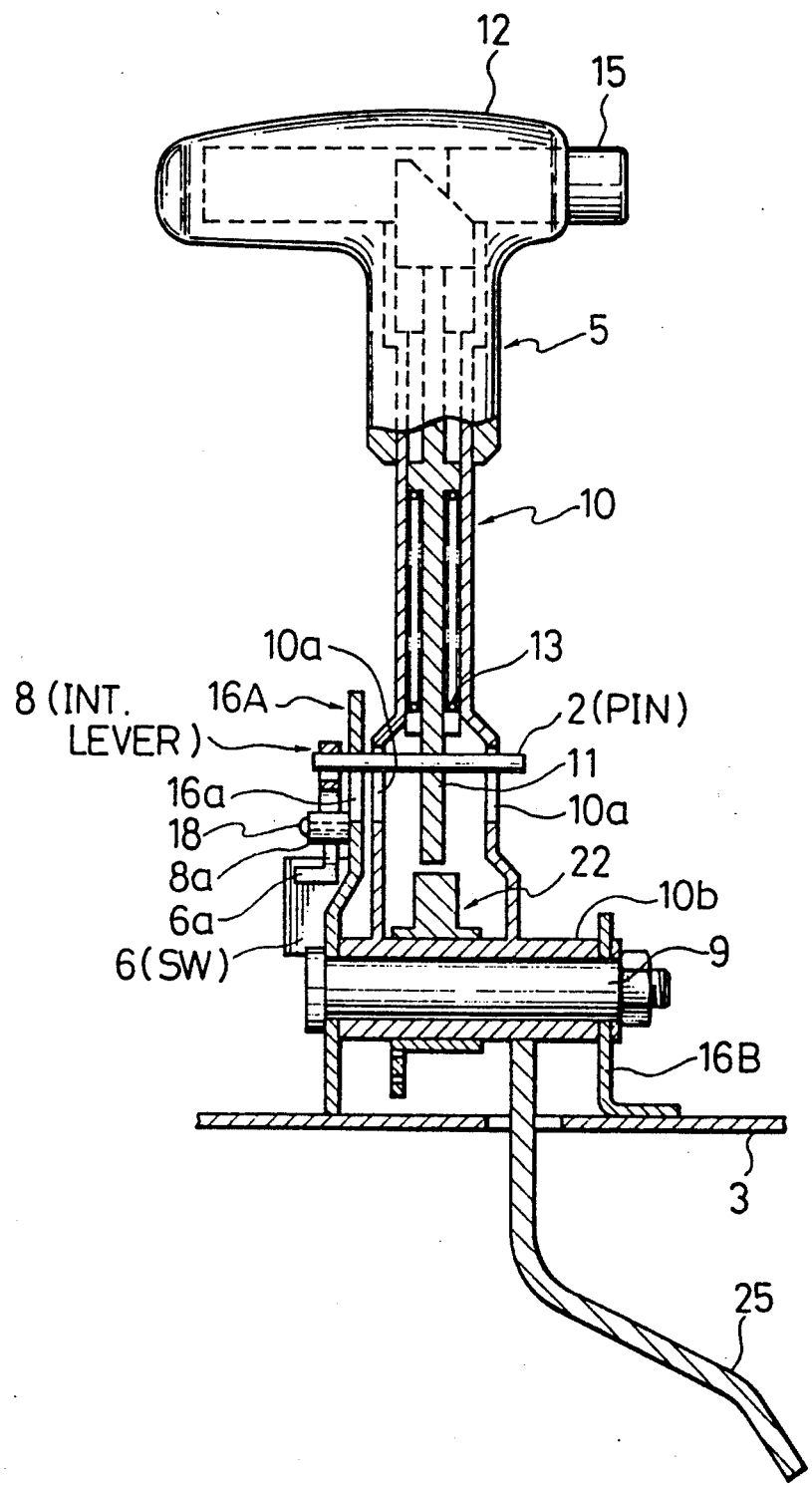
FIG. 3 is a partial cross-sectional view taken along the line III—III in FIG. 2.

FIGS. 2 to 4 show a first embodiment thereof. In FIG. 2, the feature of the shift lever apparatus of this embodiment is to provide an intermediate lever 8 (switch actuating power transmission means) between a Park-position detecting switch 6 and a position pin 2 located at Park-position of a pin locating cutout 16a formed in a shift lever support frame 16A. A shift lever 5 is composed of a lever body 10 formed with two axially extending position pin guide slots 10a (see FIG. 3) and a sleeve portion 10b, a central rod 11 axially movably disposed within the lever body 10, a compression co spring 13 for urging the central rod 11 in the upward direction, a position pin 2 fixed to the central rod 11 so as to extend through the two position pin guide slots 10a in the radial direction of the lever body 10, a lever knob 12, and a lever push button 15. Therefore, when the lever push button 15 is pushed, the central rod 11 or the position pin 2 is moved in the downward direction, so that the position pin 2 can be shifted to and fro along the lower inner side surface of the pin locating cutout 16a in FIG. 2.

Figure 4A:
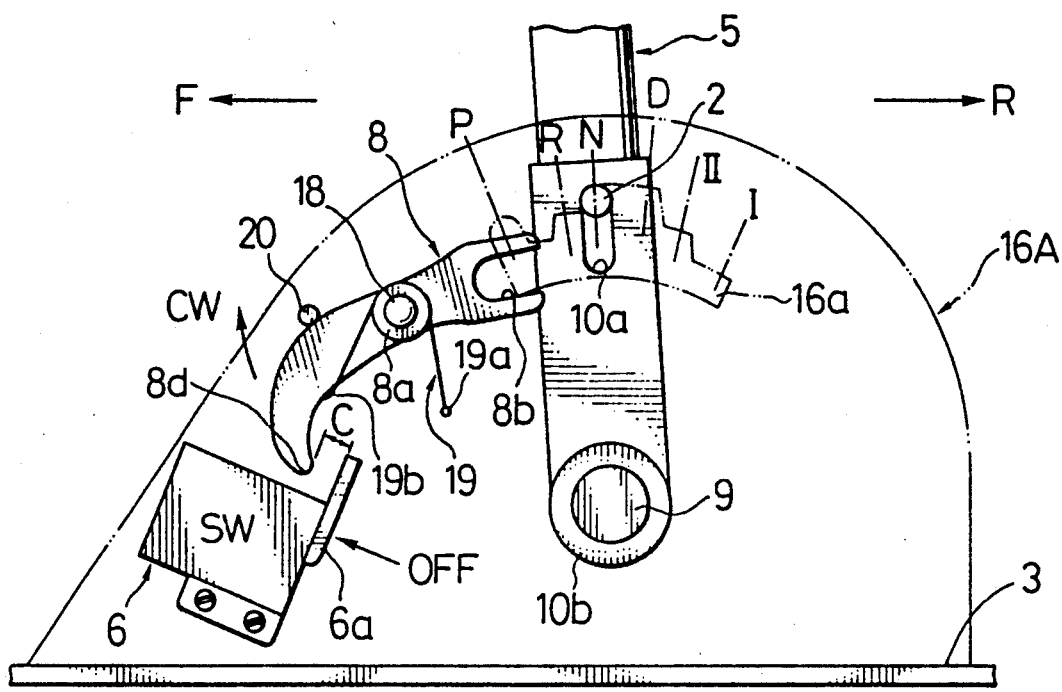
FIG. 4(A) is an enlarged partial front view showing the essential portion of the first embodiment of the shift lever apparatus according to the present invention, for assistance in explaining the operation thereof, in which the Park-position, detecting switch is turned off.

With reference to FIGS. 2 and 3, a first shift lever support plate 16A and a second shift lever support plate 16B are both fixed upright to a horizontal apparatus frame 3. The sleeve portion 10b of the shift lever body 10 is pivotally supported by a pivotal shaft 9 between the two shift lever support plates 16A and 16B. The first shift lever support plate 16A is formed with a pin locating cutout 16a having a plurality of stepped portions such as Park (P) position, Reverse (R) position, Neutral (N) position, Drive (D) position, Second speed (II) position and First speed (I) position, from the vehicle front side (F) to the vehicle rear side (R) as shown in FIG. 4(A). Further, the position pin 2 extends through this pin locating cutout 16a.

The Park-position detecting switch 6 is fixed to the first shift lever support plate 16A. This switch 6 is turned on when an actuator 6a is moved away from the switch body against an elastic force of a spring (not shown) housed within the switch 6 in an arrow direction shown in FIG. 4B and turned off when the actuator 6a is returned into the switch body by the elastic force of the spring in another direction shown in FIG. 4(A).

The intermediate lever 8 is formed with a boss portion 8a at roughly the middle thereof. This boss portion 8a is pivotally supported by a pivotal shaft 8 on the first shift lever support frame 16A as shown in FIG. 3. Further, as shown in FIGS. 4(A) and (B), a first end 8b of the intermediate lever 8 is formed into a bifurcated portion into which the position pin 2 located at the park (P) position is inserted and a second end 8d of the intermediate lever 8 is so formed as to be brought into contact with the switch actuator 6a to turn on the Park-position detecting switch 6 when the position pin 2 is urged upward by the compression coil spring 13 at the Park (P) position of the pin locating cutout 16a. In addition, the intermediate lever 8 is biased in the clockwise direction as shown by arrow CW in FIG. 4(A) by a coil spring 19 having a first end 19a inserted into a hole formed in the shift lever support frame 16A and a second end 19b engaged with one end surface of the intermediate lever 8. Further, a stopper pin 20 is fixed to the support frame 16A to locate the intermediate lever 8 in such a position as shown in FIG. 4(A), where the first end bifurcated portion 8b is positioned to receive the position pin 2 moved along the lower inner side surface of the pin locating cutout 16a and the second end 8d is positioned a little away from the actuator 6a of the Park-position detecting switch 6. Further, the elastic force of the compression coil spring 13 housed within the shift lever body 10 is determined much stronger than those of the coil spring 19 of the intermediate lever 8 and the spring (not shown) of the Park-position detecting switch 6.

Further, in FIGS. 2 and 3, the reference numeral 21 denotes a shift lock mechanism composed of a rod lock member 22 fixed to the sleeve portion 10b of the lever body 10 and an actuator 23 for pivoting the rod lock number 22. By this shift lock mechanism, the shift lever 5 will not be shifted from the Park-position to the other positions when a foot brake (not shown) is not depressed. In other words, only when the foot brake is depressed, since the actuator 23 is actuated to pivot the rod lock member 22 away from under the central rod 11, the push button 15 can be pushed and therefore the central rod 11 can be moved axially downward to shift the position pin 2 from the Park-position to the other position along the pin locating cutout 16a formed in the first shift lever support plate 16A. Further, a select lever 25 is linked with an automatic transmission (not shown) via a control rod 26.

The operation of the shift lever apparatus will be described hereinbelow with reference to FIGS. 4(A) and 4(B) when the shift lever 5 is set to a shift position (e.g. Neutral (N) position) other than the Park (P) position as shown in FIG. 4(A). The position pin 2 is urged upward by the compression coil spring 13 within the shift lever body 10 into pressure contact with the inner end surface N of the pin locating cutout 16a formed in the first support frame 16A. On the other hand, the intermediate lever 8 is urged clockwise by the coil spring 19 into contact with the stopper pin 20 in such a position that the bifurcated portion 8b of the intermediate lever 8 is located at a position where the position pin 2 can be engaged with the first bifurcated end 8b of the intermediate lever 8. Under these conditions, the second end 8d of the intermediate lever 8 is located a distance C away from the switch actuator 6a of the Park-position detecting switch 6, at which the Park-position detecting switch 6 is kept turned off.

Under these conditions, when the shift lever 5 is required to be shifted to the Park (P) position, the push button 15 (shown in FIG. 3) is pushed, so that the central rod 11 is moved downward against the biasing force of the compression coil spring 13. Therefore, the position pin 2 is brought into contact with the lower end surface of the position pin guide slots 10a formed in the lever body. In this state, when the shift lever 5 is pivoted toward the vehicle front direction F, the position pin 2 is engaged with the bifurcated portion 8b of the intermediate lever 8 at the Park-position. Thereafter, when the push button 15 is released, the position pin 2 is moved radially upward by the biasing force of the compression coil spring 13, as shown in FIG. 4(B), so that the position pin 2 is brought into contact with the Park (P) position of the pin locating cutout 16a. Therefore, the intermediate ever 8 is pivoted counterclockwise direction CCW and therefore the second end 8d of the intermediate lever 8 is brought into contact with the switch actuator 6a and further moves the switch actuator 6a away from the switch body 6 to turn on the Park-position detecting switch 6 to light up a parking lamp. Therefore, the driver can confirm that the shift lever 5 is securely set to the Park (P) position.

When the shift lever 5 is required to be shifted from Park-position to another position, since the push button 15 is depressed and then the shift lever 10 is moved in the vehicle rear direction R, the intermediate lever 8 is released from the position pin 2 at a first bifurcated end portion 8b of the intermediate lever 8 as shown in FIG. 4(A), so that the intermediate lever 8 is pivoted clockwise by an elastic force of the lever coil spring 19 and therefore the Park-position detecting switch 6 is turned off to put out the parking lamp.

Figure 4B:
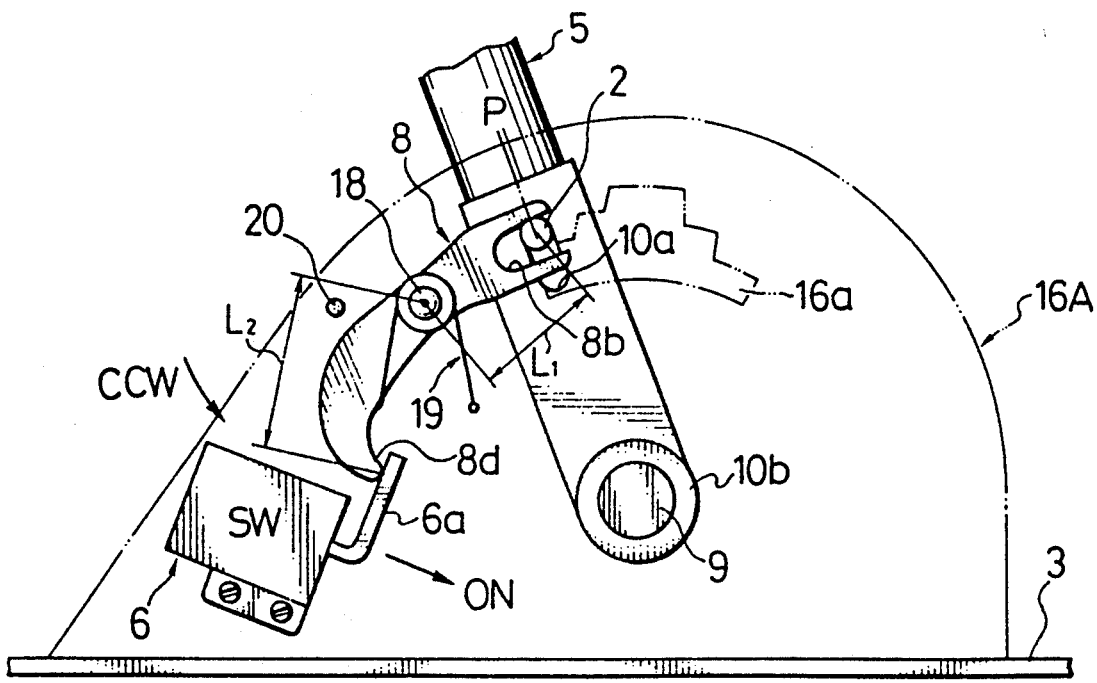

With reference to FIG. 4(B), the axial stroke of the position pin 2 within the position pin guide slots 10a often changes according to the vehicle models or the shift lever apparatus. In this embodiment, however, since a ratio of a first length $L_1$ between the pivotal shaft 18 and the contact point of the pin 2 or the first lever end of the intermediate lever 8 to the length $L_2$ between the same pivotal shaft 18 and the contact point of the actuator 6a or the second lever end of the intermediate lever 8 can be freely determined, even if the stroke of the position pin 2 within the slot 10a or the pin locating cutout 16a at the Park-position changes according to vehicle models, it is possible to use in common the same high precious Park-position detecting switch 6 by appropriately determining the ratio of the two intermediate lever distances ($L_1/L_2$), so that the switch 6 can be standardized and therefore the parts stock for manufacturing process or maintenance can be reduced. In addition, since the Park-position detecting switch 6 can be disposed at any desired position remote from the Park-position of the pin locating cutout 16a formed in the first support plate 16A by changing the shape and dimensions of the intermediate lever 8, it is possible to utilize a small space on the first shift lever support frame 16A.

Furthermore, since the switch actuator 6a can be moved smoothly in a predetermined direction by applying an actuating force to the switch 6 by freely determining the moving direction of the intermediate lever 8, it is possible to prevent the switch actuator 6a from being moved under undesired biased condition and therefore to improve the durability or life time of the switch 6.

Further, in the above-mentioned embodiment, an intermediate lever is used as switch actuating power transmitting means. Without being limited thereto, however, it is possible to adopt other mechanisms, as shown in FIG. 5 where a second embodiment of the present invention is shown.

Figure 5:
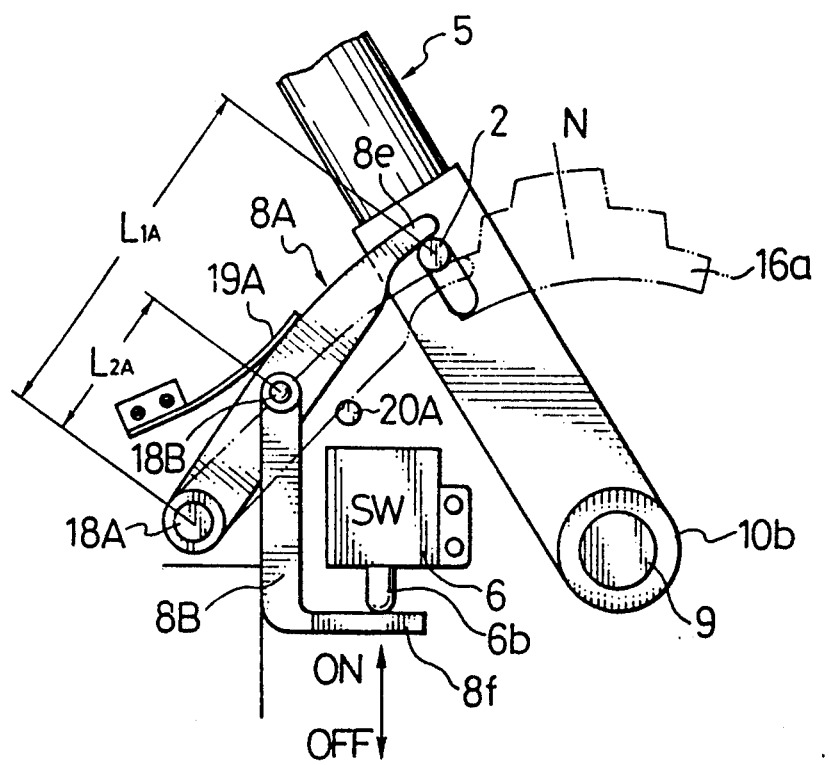
FIG. 5 is an enlarged partial front view showing the essential portion of the second embodiment of the shift lever apparatus according to the present invention.

In FIG. 5, the switch actuating power transmitting means comprises a pivotal cantilever 8A having a first pivotal center 18A and a first free end 8e engageable with the position pin 2 shifted to the Park-position, and a link lever 8B pivotally supported by the pivotal cantilever 8A at a second pivotal shaft 18B and having a second free end 8f contactable with the actuator 6b of the Park-position detecting switch 6. In this second embodiment, a leaf spring 19A is used for urging the pivotal cantilever 8A against a stopper pin 20A when cantilever 8A is not in engagement with position pin 2 in place of a coil spring, and the switch 6 is turned on when the actuator 6b is pushed into the switch 6 and turned off when the actuator 6b is moved away from the switch 6.

In this second embodiment, a ratio of a first length $L_{1A}$ between the first pivotal shaft 18A and the first free end 8e of the pivotal cantilever 8A to a second length $L_{2A}$ between the first pivotal shaft 18A and the second pivotal shaft 18B can be freely determined according to the axial stroke of the position pin 2 of the shift lever 5 to obtain a constant actuator stroke of the Park-position detecting switch 6.

The operation of this second embodiment is substantially the same as in the first embodiment, and therefore the description thereof is omitted herein.

As described above, in the shift lever apparatus according to the present invention, since switch actuating power transmitting means is disposed between the actuator of the Park-position detecting switch and the position pin of the shift lever located at the Park-position, even if the stroke of the position pin at the Park-position changes according to the types or models of automotive vehicles, it is possible to use the same standardized Park-position detecting switch in common by freely determining the shape or dimensions of the switch actuating power transmitting means (the intermediate lever or the pivotal cantilever), thus reducing the stock cost of the switch in both manufacturing process and maintenance. In addition, since the Park-position detecting switch can be mounted remote from the position pin located at Park-position, it is possible to utilize a space on the shift lever support plate or to reduce the size of the shift lever apparatus.

What is claimed is:

1. A shift level apparatus for an automotive vehicle, comprising:
  (a) a shift lever support frame formed with a pin locating cutout including at least a Park-position;
  (b) a shift lever pivotally supported by said shift lever support frame;
  (c) a position pin attached to said shift lever so as to be movable along an axial direction of said shift lever and engageable with the pin locating cutout;
  (d) a Park-position detecting switch fixedly supported on said shift lever support frame;

(e) switch actuating power transmitting means pivotally supported between said position pin and said Park-position detecting switch and on said shift lever support frame, for actuating said Park-position detecting switch only when said shift lever and said position pin are shifted to the Park-position in the pin locating cutout of said shift lever support frame; and (f) an elastic member supported on said shift lever support frame, for elastically urging said switch actuating power transmitting means to such a position that said position pin is engageable with said switch actuating power transmitting means when shifted to the Park-position.

2. The shift lever apparatus of claim 1, wherein said switch actuating power transmitting means is an intermediate lever having a first end engageable with said position pin shifted to the Park-position, a second end engageable with an actuator of said Park-position detecting switch, and a pivotal center located between said first and second ends pivotally supported by a coil spring on said shift lever support frame, a ratio of a first length $L_1$ between the pivotal center of said intermediate lever and the first end to a second length $L_2$ between the pivotal center of said intermediate lever and the second end being adjusted according to an axial stroke of said position pin of said shift lever at the Park-position to obtain a constant switch actuation stroke of said Park-position detecting switch.

3. The shift lever apparatus of claim 1, wherein said switch actuating power transmitting means comprises:

(a) a pivotal cantilever having a first pivotal center pivotally supported on said shift lever support frame and a first free end engageable with said position pin shifted to the Park-position; and (b) a link lever pivotally supported at a second pivotal center of said pivotal cantilever and having a second free end engageable with an actuator of said Park-position detecting switch, a ratio of a first length $L_{1A}$ between the first pivotal center and the first free end to a second length $L_{2A}$ between the first pivotal center and the second pivotal center being adjusted according to an axial stroke of said position pin of said shift lever at the Park-position to obtain a constant switch actuator stroke of said Park-position detecting switch.

4. The shift lever apparatus of claim 3, wherein said elastic member is a leaf spring attached to said pivotal cantilever.

* * * * *